United States Patent
Nagahama et al.

(10) Patent No.: US 10,419,298 B2
(45) Date of Patent: Sep. 17, 2019

(54) MONITORING DEVICE AND MEMORY MEDIUM FOR MONITORING COMMUNICATION BETWEEN TERMINAL DEVICES IN A GROUP

(71) Applicant: JVC KENWOOD Corporation, Yokohama-shi, Kanagawa (JP)

(72) Inventors: Tomonori Nagahama, Yokohama (JP); Ichiro Shishido, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 430 days.

(21) Appl. No.: 15/221,736

(22) Filed: Jul. 28, 2016

(65) Prior Publication Data
US 2016/0337205 A1 Nov. 17, 2016

Related U.S. Application Data

(63) Continuation of application No. PCT/JP2014/074568, filed on Sep. 17, 2014.

(30) Foreign Application Priority Data

Jan. 31, 2014 (JP) ................. 2014-017335
Jan. 31, 2014 (JP) ................. 2014-017336

(51) Int. Cl.
| | | |
|---|---|---|
| *H04L 12/24* | (2006.01) | |
| *H04W 24/04* | (2009.01) | |
| *G06F 3/0482* | (2013.01) | |
| *G06T 11/20* | (2006.01) | |
| *G06F 3/0484* | (2013.01) | |
| *H04W 24/08* | (2009.01) | |

(52) U.S. Cl.
CPC ............ *H04L 41/22* (2013.01); *G06F 3/0482* (2013.01); *G06F 3/04842* (2013.01); *G06T 11/206* (2013.01); *H04L 41/0893* (2013.01); *H04W 24/04* (2013.01); *H04W 24/08* (2013.01)

(58) Field of Classification Search
CPC ....................................... H04L 41/22
USPC ....................................... 715/736
See application file for complete search history.

(56) References Cited

U.S. PATENT DOCUMENTS

2010/0056179 A1* 3/2010 Gaenger ............. G01S 5/0036
                                                        455/456.1
2014/0024399 A1* 1/2014 Shimo ................. H04W 4/029
                                                        455/457

FOREIGN PATENT DOCUMENTS

JP 2005-018375 A 1/2005

* cited by examiner

*Primary Examiner* — Nicholas McFall
*Assistant Examiner* — Terri L Filosi
(74) *Attorney, Agent, or Firm* — Brundidge & Stanger, P.C.

(57) ABSTRACT

A plurality of groups each including a plurality of terminal devices are formed, and each of a plurality of base station devices assigns a channel to each group to enable communication from one of the terminal devices included in the group to which the channel is assigned to another terminal device included in the group, and a receiving unit receives information on the number of terminal devices included in the groups registered in each base station device. A display unit displays information indicating the number of terminal devices for each base station device based on the received information.

14 Claims, 14 Drawing Sheets

|  | Group 1 | Group 2 | Group 3 | Group N | TOTAL NUMBER REGISTERED |
|---|---|---|---|---|---|
| FIG.4A FIRST BASE STATION DEVICE | 10 | 0 | ... | ... | 200 |
| FIG.4B SECOND BASE STATION DEVICE | 30 | 3 | ... | ... | 400 |
| FIG.4C THIRD BASE STATION DEVICE | 5 | 2 | ... | ... | 100 |
| FIG.4D FOURTH BASE STATION DEVICE | 0 | 4 | ... | ... | 50 |

FIG.5

| | POINT OF TIME OF ACQUISITION | REGISTERED GROUP ELEMENTS | NUMBER OF TERMINALS REGISTERED IN A GROUP |
|---|---|---|---|
| FIRST BASE STATION DEVICE | 12:00 | {1,7,8,20,201} | {20,10,10,60,40} |
| | 12:30 | {1,2,7,8,20,201} | {20,40,10,10,60,40} |
| | ... | ... | ... |
| SECOND BASE STATION DEVICE | 12:00 | {1,7,8,20,201} | {12,20,7,30,38} |
| | 12:30 | {1,2,7,8,20} | {20,3,10,10,13} |
| | ... | ... | ... |

34

MONITORING DEVICE AND MEMORY MEDIUM FOR MONITORING COMMUNICATION BETWEEN TERMINAL DEVICES IN A GROUP

CROSS-REFERENCE TO RELATED APPLICATION

This application is based upon and claims the benefit of priority from the prior Japanese Patent Application No. 2014-17336, filed on Jan. 31, 2014 and Japanese Patent Application No. 2014-17335, filed on Jan. 31, 2014, the entire contents of which are incorporated herein by reference.

BACKGROUND

1. Field

The present invention relates to a monitoring technology and, more particularly, to a monitoring device and a memory medium for monitoring communication between terminal devices in a group.

2. Description of the Related Art

Information on mobile terminals within a specific range is collected by a base station device and stored in a positional information database in order to facilitate traffic research on passersby and vehicles in a specific area. The mobile information subsystem analyzes a time series of the information and displays the amount of movement and distribution of cell phone terminals, congestion of phone calls, etc. on a map (see, for example, patent document 1).

[patent document 1] Japanese Patent Application Publication No. 2005-18375

In a cell phone system, a base station device (base station) assigns channels to terminal devices to enable communication. Congestion in a cell phone system can be known by monitoring the number of terminal devices connected to the base station device (base station). In a business wireless system, a plurality of terminal devices form a group and the base station device (base station) assigns channels to the group. In a business wireless system like this, intra-group calls are mainly used so that the point-to-multipoint mode of call is supported. In this mode of call, usage of channels of the base station device (base station) per one session of call and the volume of communication between base station devices (base station) are more complicated than in ordinary point-to-point calls.

SUMMARY

To address the aforementioned issue, the monitoring device according to an embodiment monitors a communication system in which a plurality of groups each including a plurality of terminal devices are formed, and each of a plurality of base station devices assigns a channel to each group to enable communication from one of the terminal devices included in the group to which the channel is assigned to another terminal device included in the group, the monitoring device comprising: a receiving unit that receives information on the number of terminal devices included in the groups registered in each base station device; and a processing unit that creates display data for displaying, for each base station device, information indicating the number of terminal devices based on the information received in the receiving unit.

Another embodiment relates to a monitoring method. The method monitors a communication system in which a plurality of groups each including a plurality of terminal devices are formed, and each of a plurality of base station devices assigns a channel to each group to enable communication from one of the terminal devices included in the group to which the channel is assigned to another terminal device included in the group, the method comprising: receiving information on the number of terminal devices included in the groups registered in each base station device; and creating display data for displaying, for each base station device, information indicating the number of terminal devices based on the received information.

Another embodiment relates to a monitoring device. The device monitors a communication system in which a plurality of groups each including a plurality of terminal devices are formed, and each of a plurality of base station devices assigns a channel to each group to enable communication from one of the terminal devices included in the group to which the channel is assigned to another terminal device included in the group, the monitoring device comprising: a receiving unit that receives information on the number of terminal devices included in the groups registered in each base station device; and a processing unit that derives an index indicating a level of congestion in each base station based on the information received in the receiving unit and creates display data for displaying, for each base station device, information indicating the derived index.

Another embodiment relates to a monitoring method. The method monitors a communication system in which a plurality of groups each including a plurality of terminal devices are formed, and each of a plurality of base station devices assigns a channel to each group to enable communication from one of the terminal devices included in the group to which the channel is assigned to another terminal device included in the group, the method comprising: receiving information on the number of terminal devices included in the groups registered in each base station device; deriving an index indicating a level of congestion in each base station based on the received information; and creating display data for displaying, for each base station device, information indicating the derived index.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 4A-4D show the data structure of the information received in the receiving unit of FIG. 3;

FIG. 5 shows the data structure of the database stored in the storage unit of FIG. 3;

DETAILED DESCRIPTION

The invention will now be described by reference to the preferred embodiments. This does not intend to limit the scope of the present invention, but to exemplify the invention.

Embodiment 1

A summary of the prevent embodiment will be given before describing the embodiment in specific detail. Embodiment 1 relates to a business wireless system including a plurality of base station devices connected to a network, a plurality of terminal devices connected to the respective base station devices, and a monitoring device connected to the network. In the business wireless system, the plurality of terminal devices form a group. The base station device assigns an uplink channel and a downlink channel to a group. In this setup, one of the terminal devices in a group (hereinafter, referred to as "transmitting device") transmits a signal using the uplink channel, and another terminal device in the group (hereinafter, referred to as "receiving device") receives the signal using the downlink channel. Base station devices other than the base station device to which the transmitting device is connected also assign a downlink channel to the group so that the receiving device connected to the other base station device can also receive the signal. A similar process is performed in the other groups but communication between different groups does not basically take place.

In a business wireless system, channels are assigned in units of groups. Therefore, usage of channels of the base station device per one session of call and the volume of communication between base station devices cannot be evaluated merely by referring to the number of terminal devices and so are complicated, as described above. The monitor device included in the business wireless system according to this embodiment performs the following processes in order to know the status of communication in which intra-group calls are made. The monitoring device acquires the number of terminal devices registered in each base station device in units of groups. The monitoring device displays, for a selected group, the number of terminal devices registered in each base station device on a map. Since the status of registration of groups in each base station device is displayed collectively on a map, it is easy to know the shortage or sufficiency of system resources.

Figure 1:
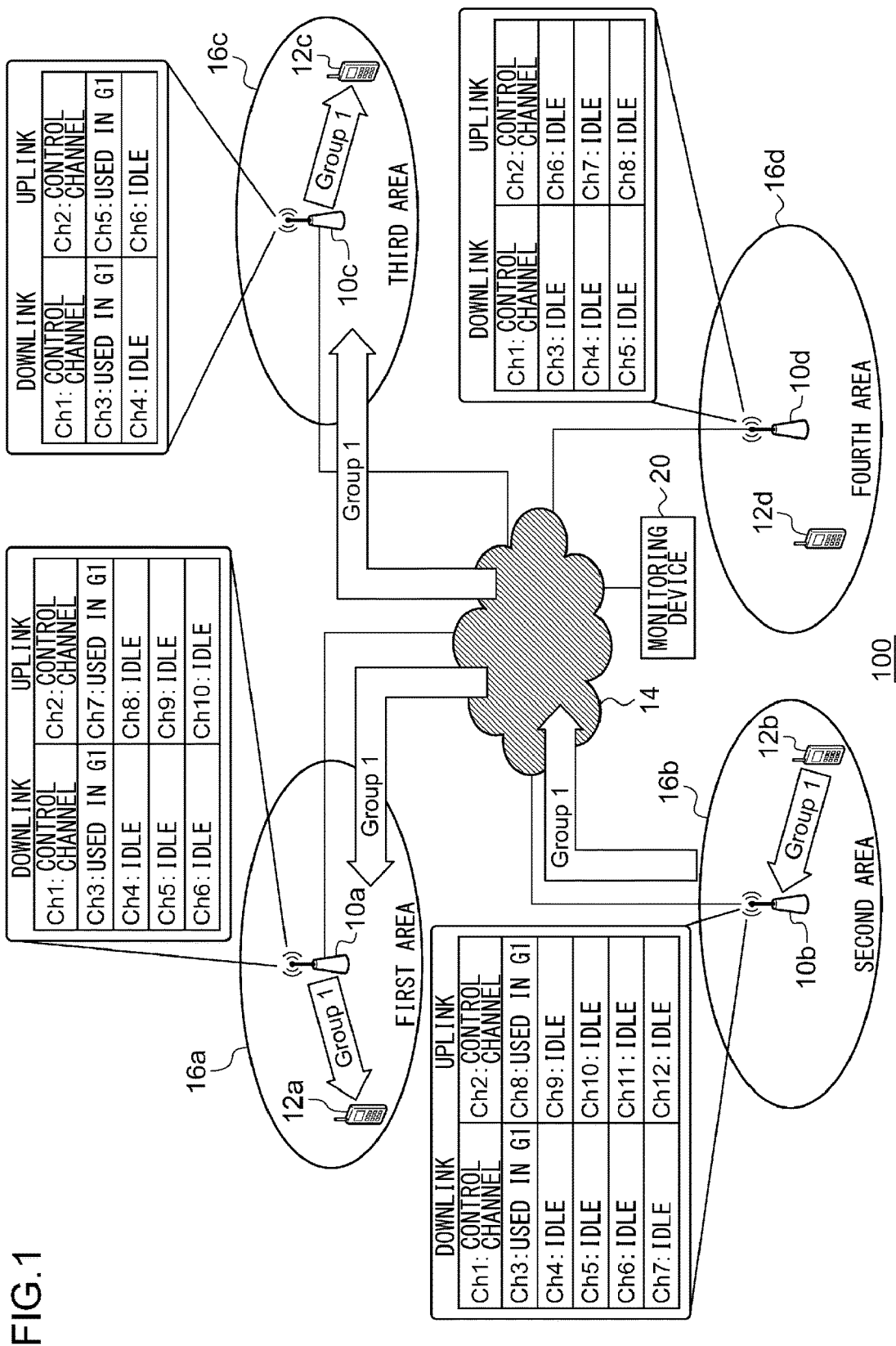
FIG. 1 shows the configuration of a business wireless system according to embodiment 1.

FIG. 1 shows the configuration of a business wireless system 100 according to embodiment 1. The business wireless system 100 includes a first base station device 10a, a second base station device 10b, a third base station device 10c, and a fourth base station device 10d, which are generically referred to as base station devices 10, a first terminal device 12a, a second terminal device 12b, a third terminal device 12c, and a fourth terminal device 12d, which are generically referred to as terminal devices 12, a network 14, and a monitoring device 20. The first base station device 10a forms a first area 16a, the second base station device 10b forms a second area 16b, the third base station device 10c forms a third area 16c, and the fourth base station device 10d forms a fourth area 16d. The first area 16a, the second area 16b, the third area 16c, and the fourth area 16d are generically referred to as areas 16. The number of base station devices 10 and the number of terminal devices 12 are not limited to "4".

The first base station device 10a through the fourth base station device 10d are connected via the network 14. The base station devices 10 are capable of assigning a plurality of channels and assign a channel to each group. A known technology may be used for the channels. By way of example, it will be assumed that the plurality of channels are multiplexed by Frequency Division Multiple Access (FDMA)/Frequency Division Duplex (FDD). For example, the first base station device 10a defines Ch1, and Ch3 through Ch6 as downlink channels and defines Ch2, and Ch7 through Ch10 as uplink channels. Ch1 is used as a downlink control channel and Ch2 is used as an uplink control channel. A combination of Ch3 and Ch7 is assigned to the same group. Ch4 through Ch6 and Ch8 through Ch10 are similarly assigned. The other base station devices 10 assign channels similarly. The number of usable channels may differ depending on the base station device 10. It will be assumed that Ch1 and Ch2 are commonly used as the downlink control channel and the uplink control channel, respectively, for all base station devices 10.

The terminal device 12 is a wireless terminal capable of communicating with another terminal device 12 via the base station device 10. Phone-call communication is assumed herein. Data communication may also take place. Upon entering the area 16, the terminal device 12 request the base station device 10 forming the area 16 to register the location of the terminal device 12. In this process, registration of the group that is used is also requested. These requests are included in the uplink control channel (Ch2) and are transmitted accordingly. Signals in the uplink control channel are transmitted on a random access basis. In response to the request, the base station device 10 registers the terminal devices 12 in units of groups.

When a call request occurs in one of the terminal devices 12, the calling terminal device 12 uses Ch2 to transmit an uplink control channel signal including a call request. The base station device 10 receiving the uplink control channel signal defines the terminal device 12 as the transmitting device and assigns channels to the group in which the transmitting device is included. The term "channels" here generically refers to a downlink channel and an uplink channel. The base station device 10 requests the other base station devices 10 to assign channels to the group via the network 14. In response to the request, the other base station devices 10 examine whether the group is registered. If the group is registered, the other base station devices 10 assign channels to the group.

The base station device 10 and the other base station devices 10 transmit downlink control channel signals including information on the assigned channels to the terminal devices 12. The rest of the terminal devices 12 included in the group (receiving devices) as well as the transmitting device recognize the assigned channels by receiving the downlink control channel signals. The transmitting device transmits a signal to the base station device 10 using the assigned uplink channel. The signal includes a digitized sound signal. If a receiving device is included in the group in which the transmitting device is included, the base station device 10 transmits the signal using the assigned downlink channel. In addition, the base station device 10 transmits the received signal to the other base station devices 10. The other base station devices 10 transmit the signal to the receiving devices using the assigned downlink channel. The receiving devices play back the sound signal based on the received signal and output the sound from the speaker.

In this way, a plurality of groups each including a plurality of terminal devices 12 are formed. Each of the plurality of base station devices 10 assigns channels in units of groups. As a result, communication takes place from one of the terminal devices 12 included in a group to which channels are assigned to the rest of the terminal devices 12 included in the group.

In the plurality of terminal devices 12 included in a group, the transmitting device and the receiving device may change their roles. If a signal that should be transmitted is generated in the terminal device 12 operating as the receiving device, the terminal device 12 is switched into a transmitting device by transmitting an uplink control channel signal including a call request. The terminal device 12 operating as the transmitting device is switched into a receiving device once the terminal device 12 completes the transmission of the signal. Intra-group calls such as this use one of the channels of the base station devices 10 when a phone call is generated. Therefore, if the terminal devices 12 included in the same group are registered in the base station devices 10 over an extensive range, one phone call uses as many channels as the base station devices 10. The above-described process is performed in each group.

FIG. 1 shows that a phone call is being made is Group 1. The second terminal device 12b is the transmitting device. The second terminal device 12b transmits a signal using Ch8 of the second base station device 10b. Group 1 is registered in the first base station device 10a and the third base station device 10c. Therefore, the first terminal device 12a receives the signal using Ch3 of the first base station device 10a, and the third terminal device 12c receives the signal using Ch3 of the third base station device 10c. Meanwhile, Group 1 is not registered in the fourth base station device 10d so that the signal from the second terminal device 12b is not output to the fourth base station device 10d.

For example, when Group 1 is registered only in the second base station device 10b, and when a call occurs in Group 1, the transmitting device transmits a signal using Ch8 of the second base station device 10b and the receiving device receives the signal using Ch3 of the second base station device 10b. Thus, only a pair of channels of one base station device 10 are used. If Group 1 is registered in two base station devices 10, one pair of channels are used in each of the two base station devices 10 when a phone call in Group 1 is generated. Therefore, two pairs of channels are used. This is equivalent to consuming as many channels as consumed in point-to-point phone call in a cell phone system. If Group 1 is registered in three or more base station devices 10, three or more pairs of channels are consumed. If all of the channels of the third base station device 10c are used by other groups, a phone call in Group 1 does not take place in the third base station device 10c. This is equivalent to a missed call or a busy state.

Figure 2:
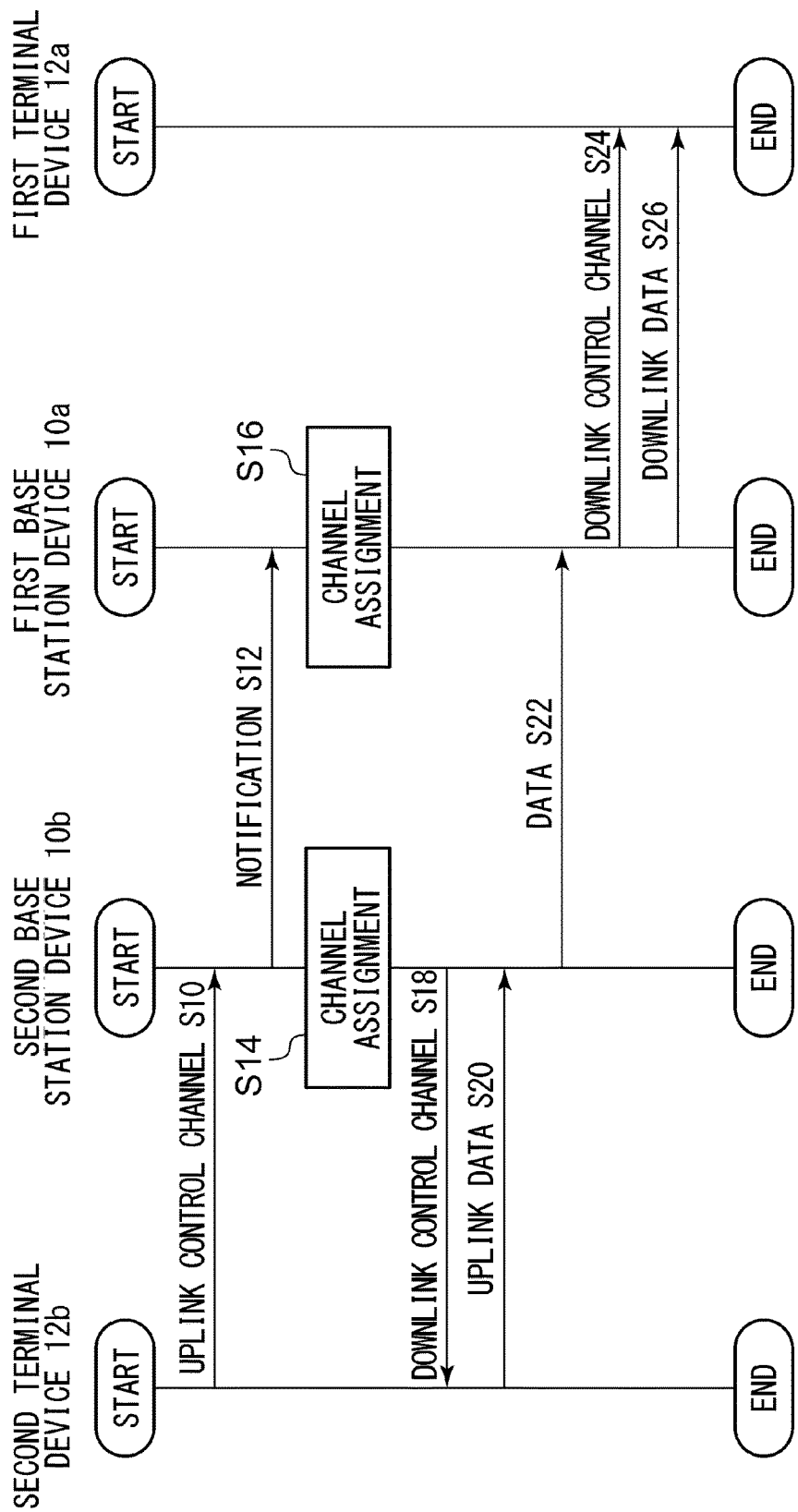
FIG. 2 is a sequence diagram showing the steps of communication in the business wireless system of FIG. 1.

FIG. 2 is a sequence diagram showing the steps of communication in the business wireless system 100. The second terminal device 12b transmits a call request using the uplink control channel (S10). The second base station device 10b communicates the call request to the first base station device 10a (S12). The second base station device 10b and the first base station device 10a assign channels to Group 1 (S14, S16). The second base station device 10b transmits a result of assignment using the downlink control channel (S18). The second terminal device 12b transmits uplink data to the second base station device 10b (S20). The second base station device 10b transmits the data to the first base station device 10a (S22). The first base station device 10a transmits the result of assignment using the downlink control channel (S24). The first base station device 10a transmits downlink data to the first terminal device 12a (S26).

Figure 3:
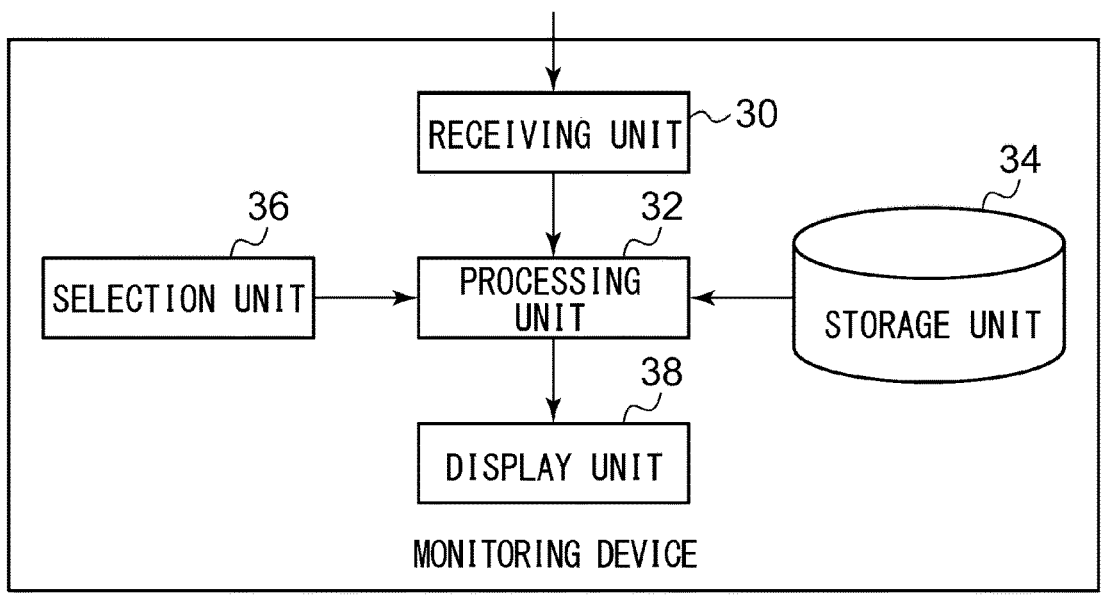
FIG. 3 shows the configuration of the monitoring device of FIG. 1.

FIG. 3 shows the configuration of the monitoring device 20. The monitoring device 20 includes a receiving unit 30, a processing unit 32, a storage unit 34, a selection unit 36, and a display unit 38. The receiving unit 30 is connected to the network 14 of FIG. 1. The receiving unit 30 receives information from each of the plurality of base station devices 10 via the network 14. The information represents the number of terminal devices 12 included in the groups registered in each base station device 10. FIGS. 4A-4D show the data structure of the information received in the receiving unit 30. FIG. 4A shows information from the first base station device 10a. FIG. 4A shows the number of terminal devices 12 included in each group and the total number of terminal devices 12. The above explanation also applies to FIGS. 4B-4D. Alternatively, the information may not be received from each base station device 10 and may be stored in a database (not shown) temporarily so that the receiving unit 30 may receive the information from the database. Reference is made back to FIG. 3.

The processing unit 32 outputs the information received in the receiving unit 30 to the storage unit 34. The storage unit 34 stores the information from the processing unit 32 in a database. FIG. 5 shows the data structure of the database stored in the storage unit 34. The storage unit 34 stores the time series of the groups registered in the respective base station devices 10 and of the number of terminal devices 12. The point of time of acquisition indicates the point of time when the information is acquired. The unit of time may be optional. For example, hour, minute, second, millisecond, microsecond, etc. may be used. In this embodiment, hour and minute are used and a notation like "12:30" is used for brevity. The point of time of acquisition may be "date and time of acquisition" including information on a year, month, day, day of week, etc. In the following, the date and time of acquisition is also denoted as the point of time of acquisition. Numerals assigned to registered groups are listed under the heading "registered group elements", and the number of terminal devices 12 included in each group is listed under the heading "number of terminals registered in a group". Reference is made back to FIG. 3.

Figure 6:
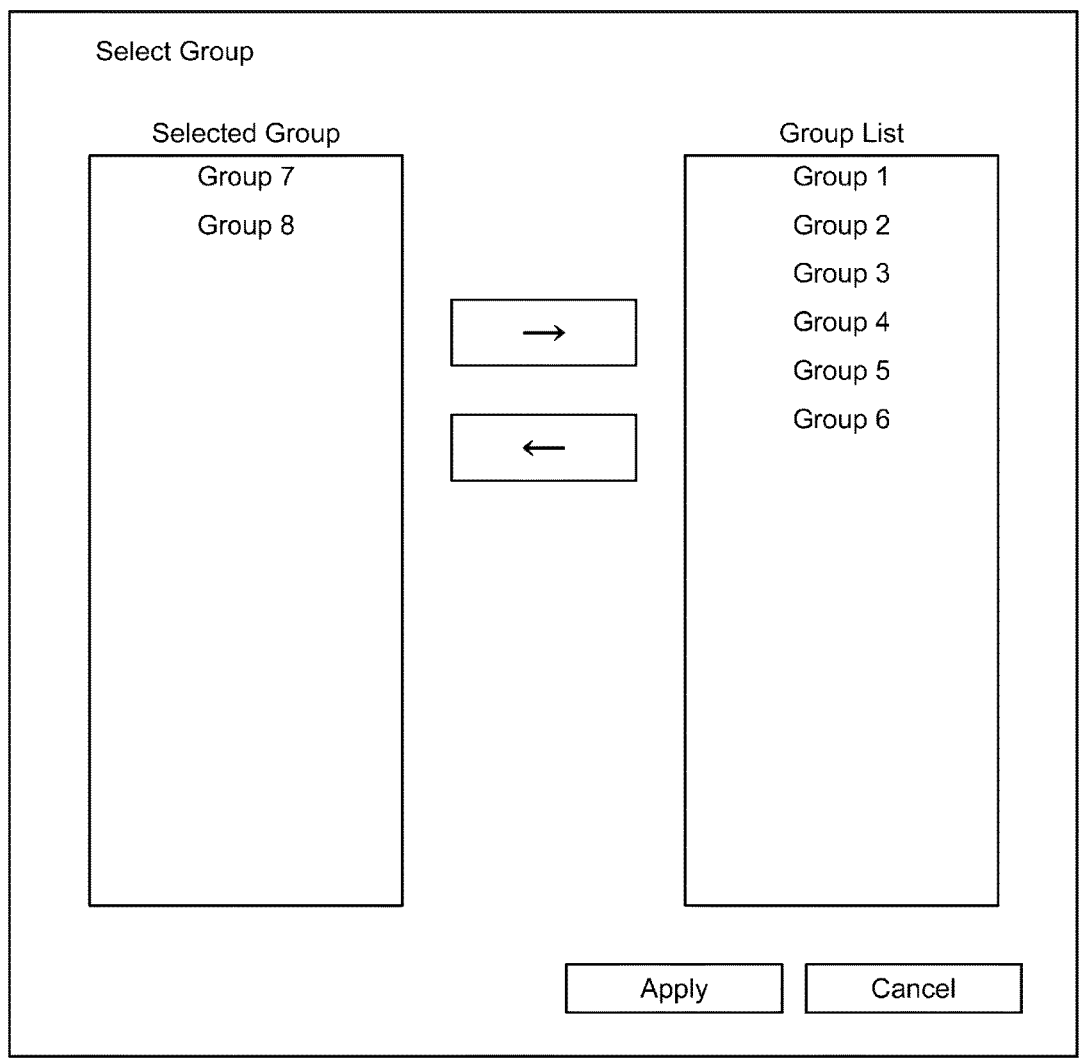
FIG. 6 shows a screen for selection of a group displayed on the display unit of FIG. 3.

The selection unit 36 is an interface that allows the user to select a group subject to monitoring. The processing unit 32 creates display data (screen data) for selection of a group and causes the display unit 38 to display the data. FIG. 6 shows a screen for selection of a group displayed on the display unit 38. The processing unit 32 acquires a list of groups from the storage unit 34 and creates data for displaying the list in "GroupList". The user selects a group by moving a group to "SelectedGroup" by using a controller such as a keyboard or mouse. The screen for the selection of a group may be built of a radio button and a pull-down menu. Reference is made back to FIG. 3. Thus, the selection unit 36 selects one of the plurality of groups and outputs a result of selection to the processing unit 32.

The processing unit 32 receives the result of selection from the selection unit 36. The processing unit 32 extracts, from the storage unit 34, the number of terminal devices 12 included in the group selected in the selection unit 36, for each base station device 10. The processing unit 32 creates, for each base station device 10, a circle graph having a radius commensurate with the number of extracted terminal devices 12. For example, the larger the number of terminal devices 12, the larger the radius of the circle graph. The processing unit 32 maintains a map image on which the locations of the base station devices 10 are mapped and superimposes the circle graph corresponding to a base station device 10 at the location of that base station device 10. The same process is performed for each base station device 10. The processing unit 32 causes the display unit 38 to display the display data on which the circle graph is superimposed (hereinafter, also referred to as "map image"). In other words, the processing unit 32 creates the display data and causes the display unit 38 to display the same.

Although a circle graph is used to show the number of terminal devices 12 connected to the base station device 10, the use of a circle graph is optional. For example, a bar graph may alternatively be used. In this case, the larger the number of terminal devices 12, the longer the bar so that the user can recognize the number of terminal devices 12. For example, forms other than a circle (e.g., square) may be used. In this case, too, the number of terminal devices 12 is displayed in a manner recognizable by the user. Still alternatively, the map image may be omitted so that only the graph is created. Yet alternatively, only the number of terminal devices 12 may be shown. It will be assumed here that the map image is not omitted.

Figure 7:
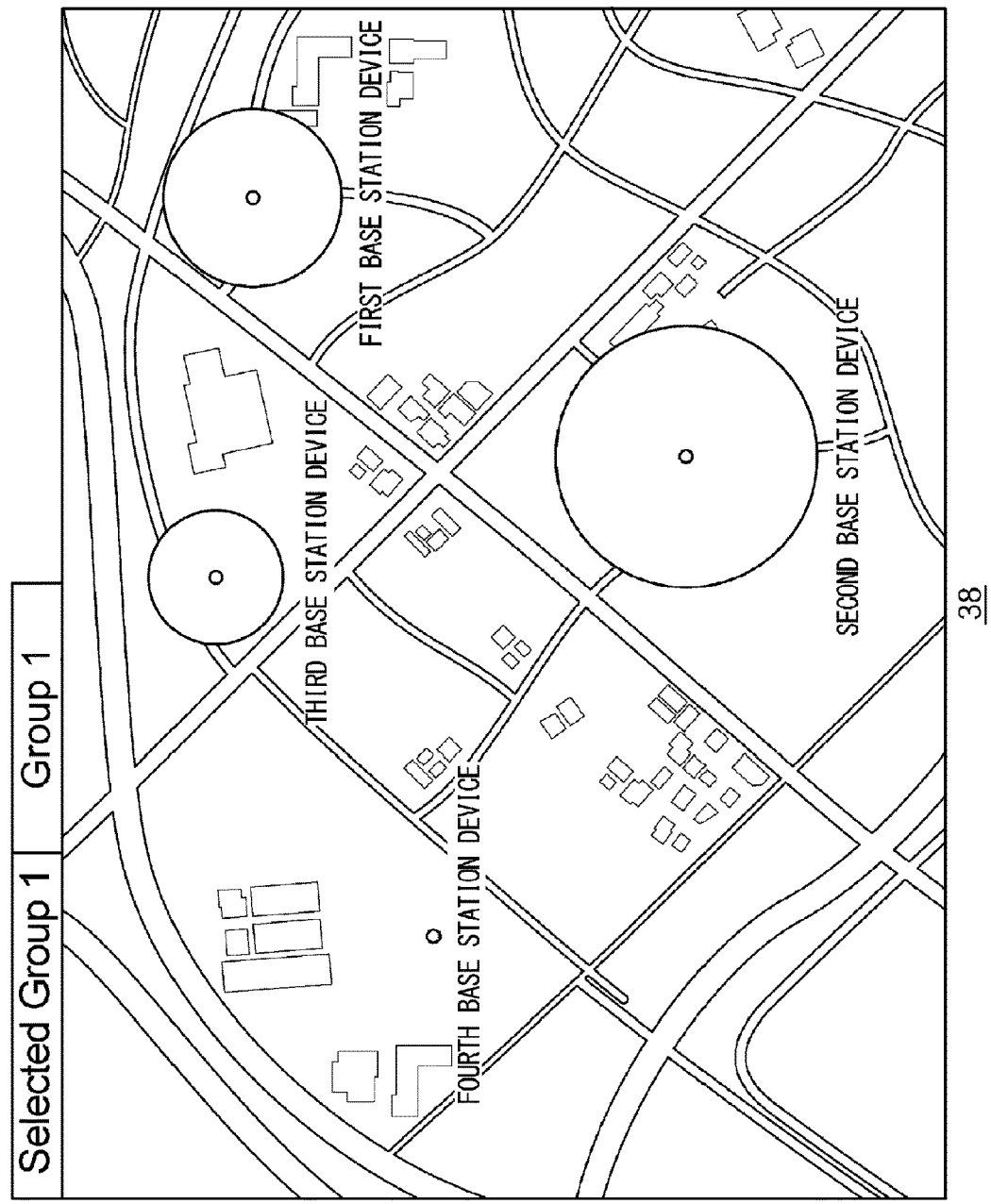
FIG. 7 shows a screen displayed on the display unit of FIG. 3.

The display unit 38 displays the map image from the processing unit 32. In other words, the display unit 38 displays, for each base station device 10, the number of terminal devices 12 included in the group selected in the selection unit 36 in the form of a circle graph. FIG. 7 shows a screen displayed on the display unit 38. In this case, Group 1 is selected. As shown in the figure, a circle graph having a radius proportional to the number of terminal devices 12 included in Group 1 is shown at the location of each base station device 10. Thus, the display unit 38 displays information indicating the number of terminal devices 12 included in at least one group, based on the information received in the receiving unit 30. The display unit 38 may not be included in the monitoring device 20. Instead, a display device (not shown) may be connected to the monitoring device 20 so as to display the information.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

According to this embodiment, the number of terminal devices included in at least one group is displayed for each base station device, based on the information on the number of terminal devices included in the groups registered in each base station device. Therefore, the status of communication in which intra-group calls are made can be known. Since one of the plurality of groups is selected and the number of terminal devices included in the selected group is displayed for each base station device, the status of communication in a given group can be easily known. Further, since the number of terminal devices included in the selected group is displayed for each base station device by using a graph and a map image, the status of distribution of terminal devices in a given group and areas where communication between base station devices occur can be easily known. The larger the radius of a circle graph, the higher the likelihood of a call from the terminal device. Accordingly, the degree of shortage of channel resources in the base station device can be estimated.

Embodiment 2

A description will now be given of Embodiment 2. Like Embodiment 1, Embodiment 2 relates to a business wireless system that includes a monitoring device. The monitoring device according to Embodiment 1 displays, for a selected group, the number of terminal devices registered in each base station, using a graph. Such a mode of display makes it possible to know the status of communication at a given point of time. Generally, the status of communication varies over time. Embodiment 2 is directed to the purpose of allowing the user to know a variation in the status of communication. The monitoring device according to Embodiment 2 changes the display of Embodiment 1 in time sequence. In this process, the information is displayed in animation. The business wireless system 100 and the monitoring device 20 according to Embodiment 2 are of the same type as those of FIGS. 1 and 3. The following description concerns a difference.

The receiving unit 30 successively receives the information from the plurality of base station devices 10 via the network 14. For example, the receiving unit 30 receives the information periodically. Each of the information successively received represents the number of terminal devices 12 included in the groups registered in each base station device 10 and represents the number at a certain point of time. The processing unit 32 receives a result of selection from the selection unit 36. The processing unit 32 extracts, from the storage unit 34, the number of terminal devices 12 included in the group selected in the selection unit 36, for each base station device 10. As described above, the processing unit 32 creates a map image on which a circle graph is superimposed (hereinafter, also referred to as "map image"). The processing unit 32 causes the display unit 38 to display the circle graph thus created. The processing unit 32 repeatedly executes the above process, changing the point of time of acquisition in FIG. 5. As a result, the processing unit 32 updates the map image with the elapse of time. The information on the current date and time may be displayed and updated on the map image on a real time basis. Alternatively, the past information may be displayed in animation for a short period of time.

Figure 8A:
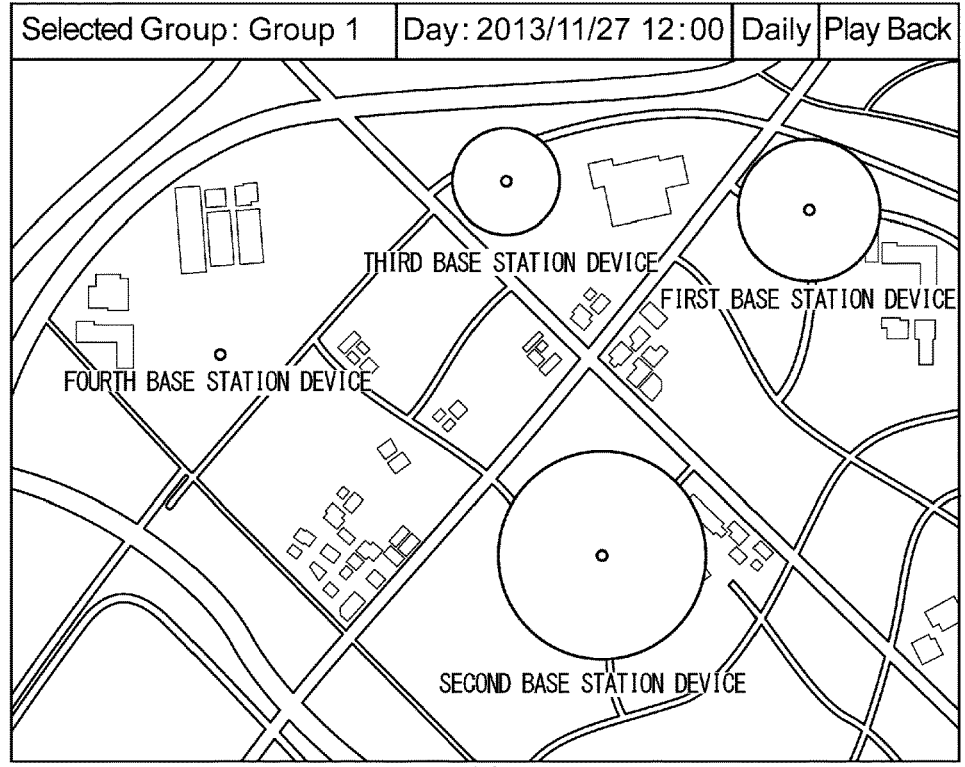
FIGS. 8A-8B show screens displayed on the display unit according to Embodiment 2.
Figure 8B:
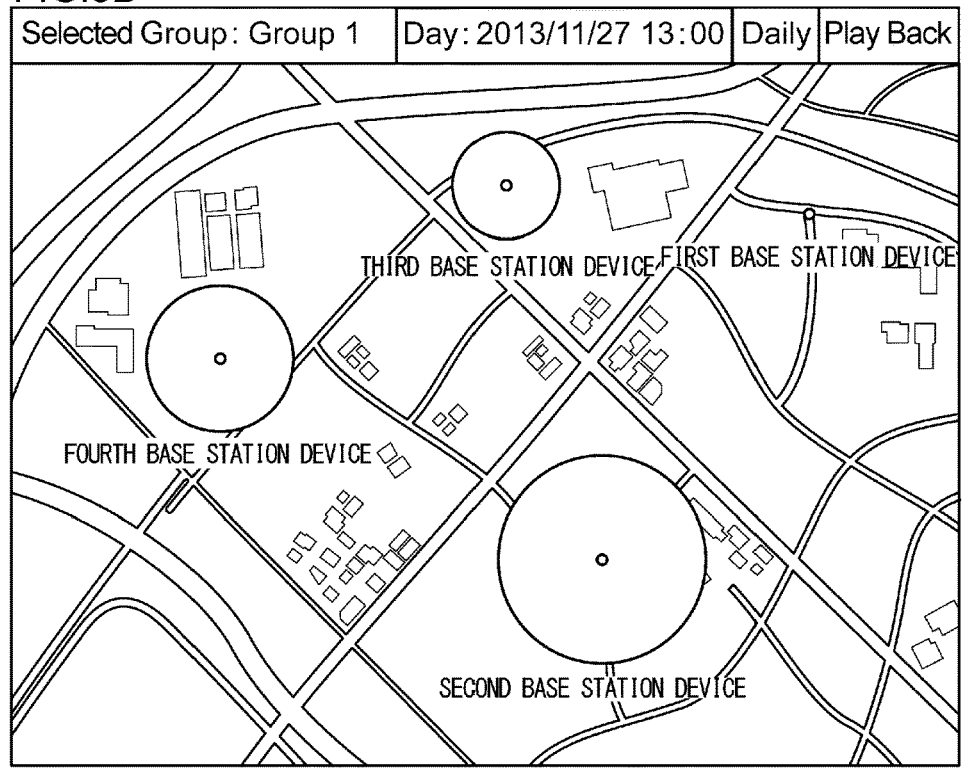

The display unit 38 updates the map image on display in accordance with the information successively received in the receiving unit 30. FIGS. 8A-8B show screens displayed on the display unit 38 according to Embodiment 2. FIG. 8A shows a map image at a certain point of time (2013/11/27 12:00) and corresponds to FIG. 7. FIG. 8B shows a map image at a point of time (2013/11/27 13:00) later than the point of time of FIG. 8A. When the user designates a point of time or a range of points of time, the display unit 38 may display only a map image at a designated point(s) of time.

Further, as illustrated in FIGS. 8A and 8B, a "playback" button may be placed on a screen displayed on the display unit 38 so that an amination showing the variation in the number of terminal devices 12 at past points of time of acquisition may be displayed as the user presses the "playback" button. The point of time of acquisition (date and time of acquisition) of data may be superimposed on each frame (each graph) forming the animation. The playback capability allows understanding of the variation in the number of terminal devices registered in each base station device in a period of time shorter than the real time so that user convenience is improved.

The processing unit 32 may use a plurality of items of data that differ in points of time of acquisition (date and time of acquisition) to calculate new data by a statistical process and cause the display unit 38 to display the data. For example, the processing unit 32 may store data for 30 days acquired at 30 minute intervals ("12:00", "12:30", etc.) in the database of the storage unit 34. The processing unit 32 may calculate an average value of the 30 items of data representing a certain point of time (e.g., "12:00"). In this way, an average value of the number of terminal devices 12 included in a group registered in the base station device 10 calculated for a designated point of time in a day (24 hours) may be displayed along with the time information. By calculating an average value, impact from unexpected events is reduced so that the tendency in time-dependent change in the number of terminal devices with the elapse of time can be displayed with a high precision. Other than the average value, a statistical value (e.g., a representative value) like a median value, mode value, quartile, maximum value, and minimum value may be calculated and a graph based on the calculated value may be created.

Further, a statistical value such as an average value may be calculated by using data on the same day of week and at the same point of time. For example, a plurality of items of data corresponding to "17:30 of Friday" may be read from the database of the storage unit 34 so as to calculate and display a statistical value. A Statistical value may be calculated from values obtained after an elapse of certain time since the beginning of each month (0:00 of the first day) of the month and used accordingly. For example, data for 12 months may be stored in the database and a statistical value may be calculated from the 12 items of data corresponding to "12:00 of the second day of month". Data that differ slightly in the point of time of acquisition may be regarded as representing the same point of time for the purpose of computation. Statistical values calculated in this way may not necessarily be displayed in animation. For example, a statistical value corresponding to only a single point of time (e.g., "12:00") may be calculated from a plurality of items of data. In this case, only a single image is created for display. Therefore, a still image is displayed instead of an animation.

According to this embodiment, the display is updated so that time-dependent change in the number of terminal devices can be easily known. Further, since the time-dependent transition in distribution in a group is displayed, it is easy to determine whether a site requires channel resources only temporarily or there is constant shortage of resources.

Embodiment 3

A description will now be given of Embodiment 3. Like the foregoing embodiments, Embodiment 3 relates to a business wireless system that includes a monitoring device. In the foregoing embodiments, the number of terminal devices registered in the respective base station devices is displayed for the selected group. By way of contrast, Embodiment 3 is directed to the purpose of allowing the user to know the status of communication involving a plurality of groups. The monitoring device according to Embodiment 3 displays information indicating the total number of terminal devices 12 included in the entire groups, instead of the selected group. The monitoring device also displays information indicating the proportion of the number of terminal devices in each group registered in the base station device. The business wireless system 100 according to Embodiment 3 is of the same type as that of FIG. 1. The following description concerns a difference.

Figure 9:
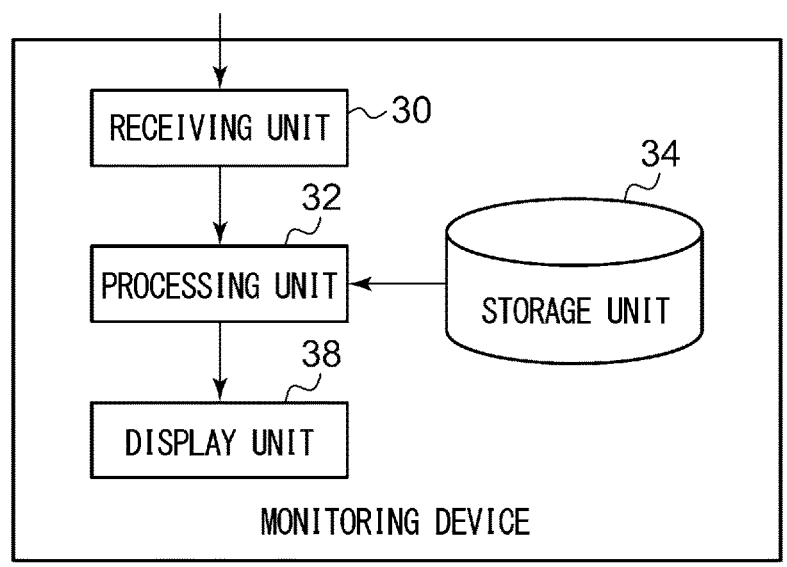
FIG. 9 shows the configuration of the monitoring device according to Embodiment 3.

FIG. 9 shows the configuration of the monitoring device 20 according to Embodiment 3. The monitoring device 20 includes the receiving unit 30, the processing unit 32, the storage unit 34, and the display unit 38. The processing unit 32 calculates the total number of terminal devices 12 included in the entire groups registered in a given base station device 10. Taking FIG. 5 as an example, the total of "20", "10", "60", and "40" listed under the heading "number of terminals registered in a group" is calculated for the first base station device 10*a* at the point of time acquisition "12:00". The processing unit 32 creates a circle graph having a radius commensurate with the total number. For example, the larger the total number, the larger the radius of the circle graph.

In this process, the circle graph is segmented in accordance with the proportion of the number of terminal devices 12 in each group relative to the total number. For example, the circle graph is segmented such that a sector having a larger central angle is formed for a group with a larger proportion of the number of terminal devices 12 relative to the total number. As in the foregoing embodiments, the processing unit 32 maintains a map image on which the locations of the base station devices 10 are mapped and superimposes the circle graph corresponding to a base station device 10 at the location of that base station device 10. The same process is performed for each base station device 10. The processing unit 32 causes the display unit 38 to display a map image on which the circle graph is superimposed (hereinafter, also referred to as "map image").

Figure 10:
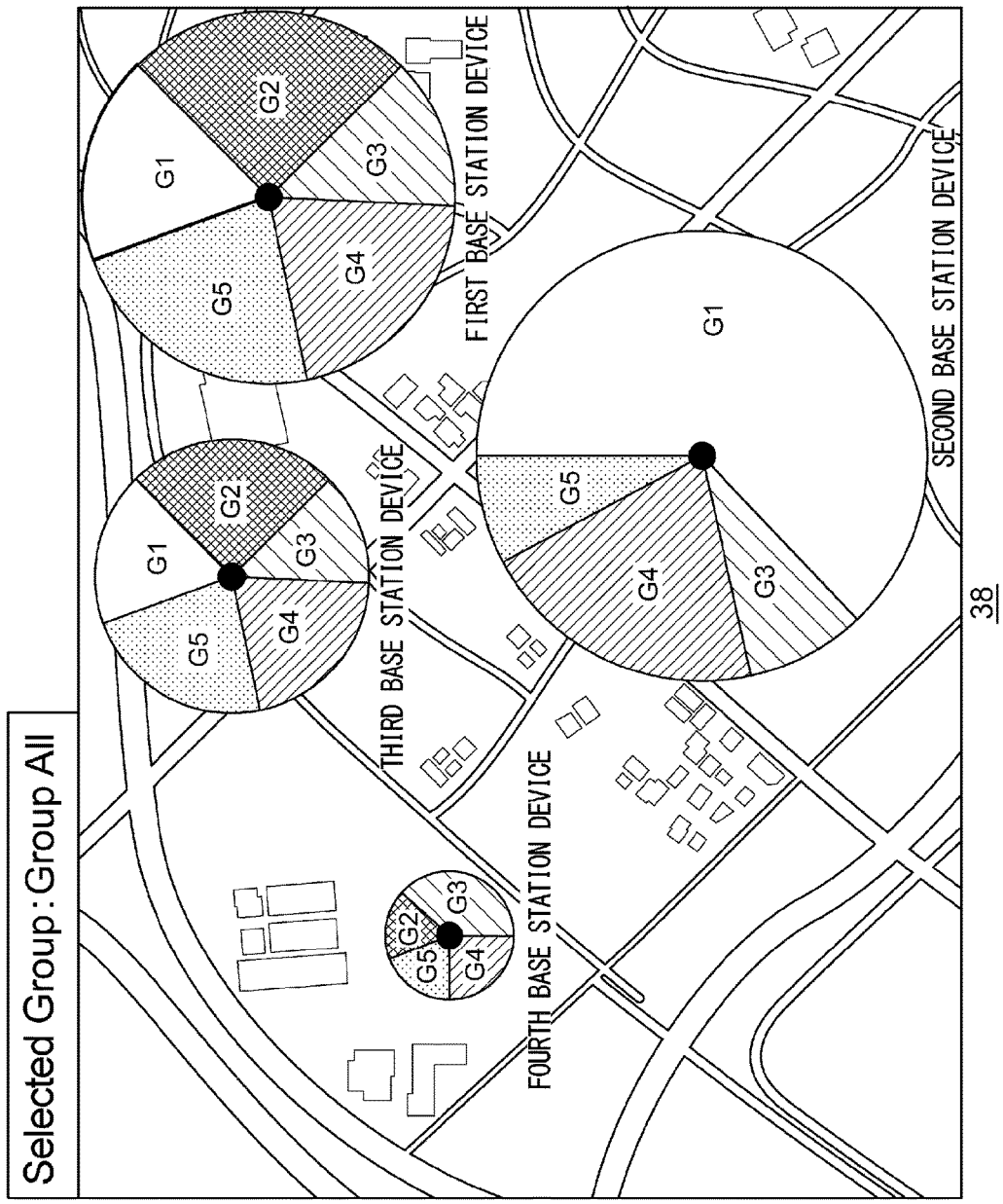
FIG. 10 shows a screen displayed on the display unit of FIG. 9.

The display unit 38 displays the map image from the processing unit 32. In other words, the display unit 38 displays, for each base station device, information indicating the total number of terminal devices 12 included in the groups registered in the base station device 10 and the proportion of the number of terminal devices 12 in each group registered in the base station device 10 relative to the total number. FIG. 10 shows a screen displayed on the display unit 38. As described above, the total number of terminal devices 12 included in the groups registered in each base station is represented by the size of radius of the circle graph. The proportion occupied by each group relative to the total number is represented by the angle of the sector. The sectors representing the respective groups may be colored differently depending on the group.

Figure 11:
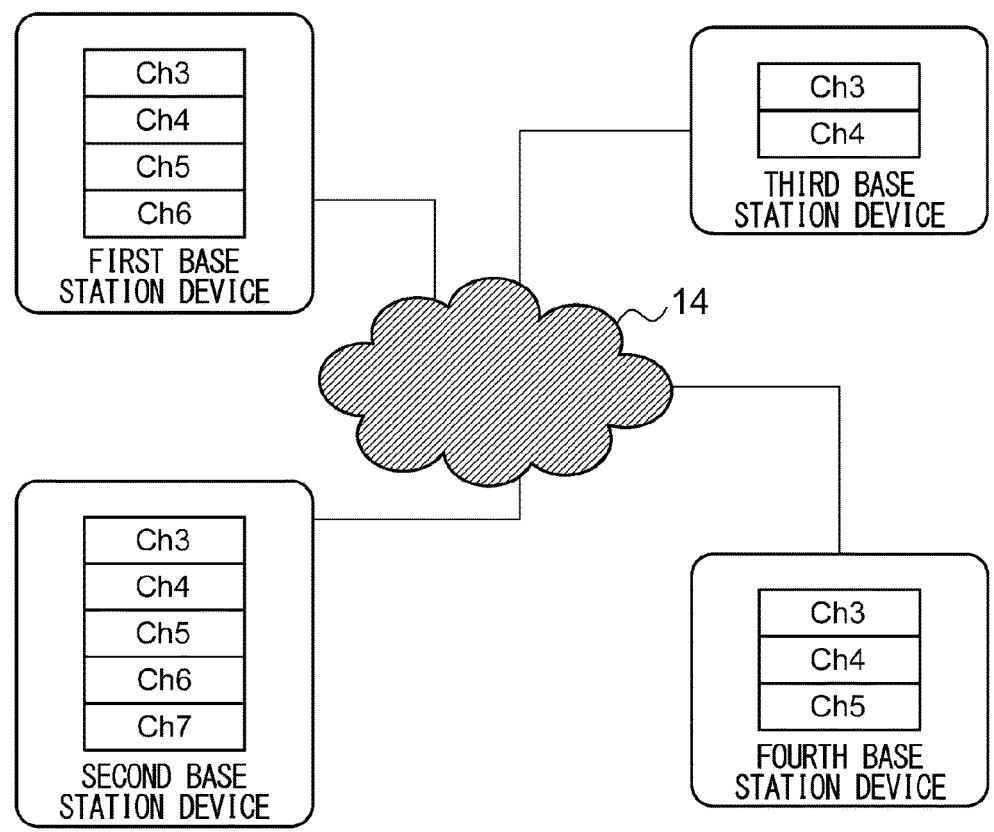
FIG. 11 shows an exemplary channel configuration in the business wireless system according to Embodiment 3.
Figure 12:
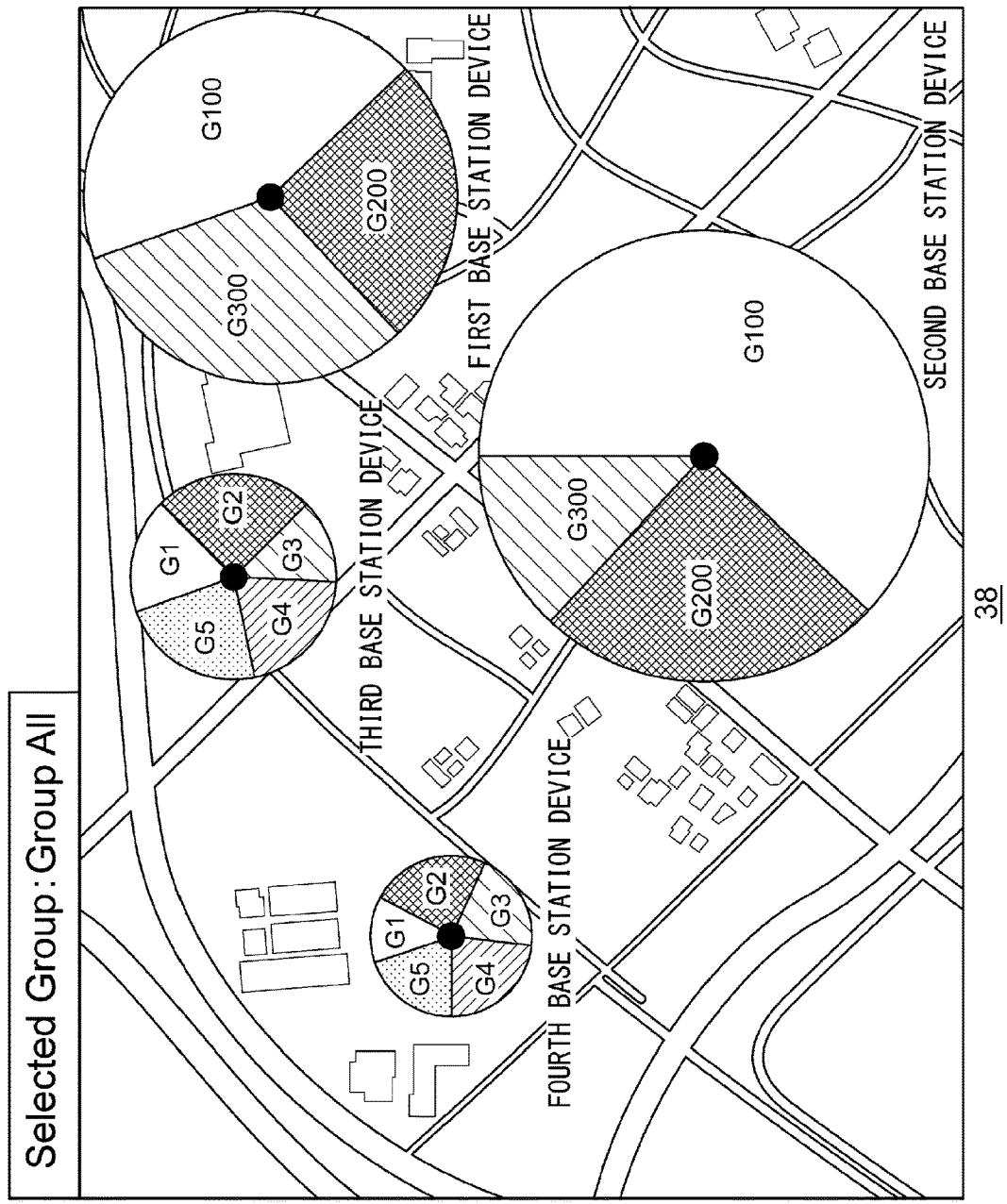
FIG. 12 shows a screen corresponding to the example of FIG. 11.

A description of Embodiment 3 will be given in further detail with reference to FIGS. 11 and 12. FIG. 11 shows an exemplary channel configuration in the business wireless system 100 according to Embodiment 3. FIG. 11 is similar to FIG. 1 except that downlink control channels, uplink control channels, and uplink channels are omitted, and only downlink channels are shown for brevity. Therefore, a combination of a downlink channel and an uplink channel will be described as a channel. FIG. 12 shows a screen corresponding to the example of FIG. 11.

In this case, a call occurs between the first base station device 10*a* and the second base station device 10*b*. In a group call, only one channel is used per group so that there will be sufficient channel resources even if the number of terminal devices 12 is large. Consequently, it can be said that there is no need to increase the channel resources for the first base station device 10a and the second base station device 10b. Further, the number of groups in each of the first base station device 10a and the second base station device 10b is small so that the volume of communication between the first base station device 10a and the second base station device 10b need be small. Consequently, it can be said that there is no need to increase resources between the first base station device 10a and the second base station device 10b.

Meanwhile, the number of groups registered in the third base station device 10c and the fourth base station device 10d is large despite the fact that channel resources are scarce. The total number of terminal devices 12 in the third base station device 10c and the fourth base station device 10d is small, but channel resources are not secured for all of the groups. Even if the channel resources are increased, it is expected that the volume of communication between the third base station device 10c and the fourth base station device 10d will be approximately double the volume of communication between the first base station device 10a and the second base station device 10b, if a call is made in all of the groups. Provision of the display as shown in FIG. 12 makes it easy for the user to determine the volume of communication between the base station devices 10 and the need for increase in the channel resources in the base station devices 10.

In the screen shown in FIG. 12, information related to channel resources (e.g., number of channels) maintained in each base station may be displayed in association with the circle graph of the base station. For example, the screen in FIG. 12 may show "first base station device (number of channels=4)" instead of "first base station device". Alternatively, information related to channel resources maintained in the base station may be displayed at the center of the circle graph. By displaying such information, the user can know the shortage or sufficiency of system resources even more easily.

As in Embodiment 2, the display of FIG. 12 may be changed in time sequence. In this case, the display may be on a real time basis or the data at past points of time acquisition may be played back at a rate different from that of the real time.

According to this embodiment, the total number of terminal devices included in the groups registered in a base station device is displayed so that the likelihood of a call being generated can easily be known. Since the proportion of terminal devices in each group registered in the base station device relative to the total number is displayed, it is easy to know the traffic in group calls. Further, since the distribution of terminal devices across the entire groups in each base station device is shown, the degree of shortage of channel resources in units of the base station device can be estimated.

Embodiment 4

A description will now be given of Embodiment 4. Like the foregoing embodiments, Embodiment 4 relates to a business wireless system that includes a monitoring device. Embodiment 4 is directed to the purpose of allowing the user to know how a group registered in a base station device of interest is registered in other base station devices. In a group call, communication takes place between base station devices in which the same group is registered, as described above. Therefore, the route on which communication between base station devices occurs is recognized by recognizing how a group registered in a base station device of interest is registered in other base station devices. The monitoring device according to Embodiment 4 displays whether a group registered in a selected base station device is registered in other base station devices. The business wireless system 100 and the monitoring device 20 according to Embodiment 4 are of the same type as those of FIGS. 1 and 3. The following description concerns a difference.

The selection unit 36 selects one base station device 10 in accordance with an instruction from the user. Prior to this, the user selects one base station device 10 from the plurality of base station devices 10 by using a controller such as a keyboard or mouse. The selection unit 36 outputs a result of selection to the processing unit 32.

The processing unit 32 receives the result of selection from the selection unit 36. The processing unit 32 identifies groups registered in the base station device 10 selected in the selection unit 36 by referring to the storage unit 34. For example, given that group 3, group 4, and group 5 are registered in the fourth base station device 10d, the processing unit 32 identifies group 3, group 4, and group 5 when the fourth base station device 10d is selected. As in Embodiment 3, the processing unit 32 calculates the total number of terminal devices 12 included in the entire groups registered in the selected base station device 10. The processing unit 32 creates a circle graph having a radius commensurate with the total number. Further, the processing unit 32 segments the circle graph in accordance with the proportion of the number of terminal devices 12 in each group. As a result, a graph similar to that of Embodiment 3 is created for the selected base station device 10.

Further, the processing unit 32 detects the other base station devices 10 in which the identified groups are registered by referring to the database stored in the storage unit 34. One or more base station device 10 may be detected. The processing unit 32 calculates the total number of terminal devices 12 included in the identified groups for each of the base station devices 10 detected. The processing unit 32 creates a circle graph having a radius commensurate with the total number. In the example given above, the total numbers of terminal devices 12 included in group 3, group 4, and group 5 are calculated for each base station device 10 detected. Further, the processing unit 32 segments the circle graph in accordance with the proportion of the number of terminal devices 12 in each group relative to the total number.

As in the foregoing embodiments, the processing unit 32 maintains a map image on which the locations of the base station devices 10 are mapped and superimposes the circle graph corresponding to a base station device 10 at the location of that base station device 10. The same process is performed for each base station device 10. The processing unit 32 performs process as described above for all other base station devices 10. The processing unit 32 causes the display unit 38 to display the display data on which the circle graph is superimposed (hereinafter, also referred to as "map image").

Figure 13:
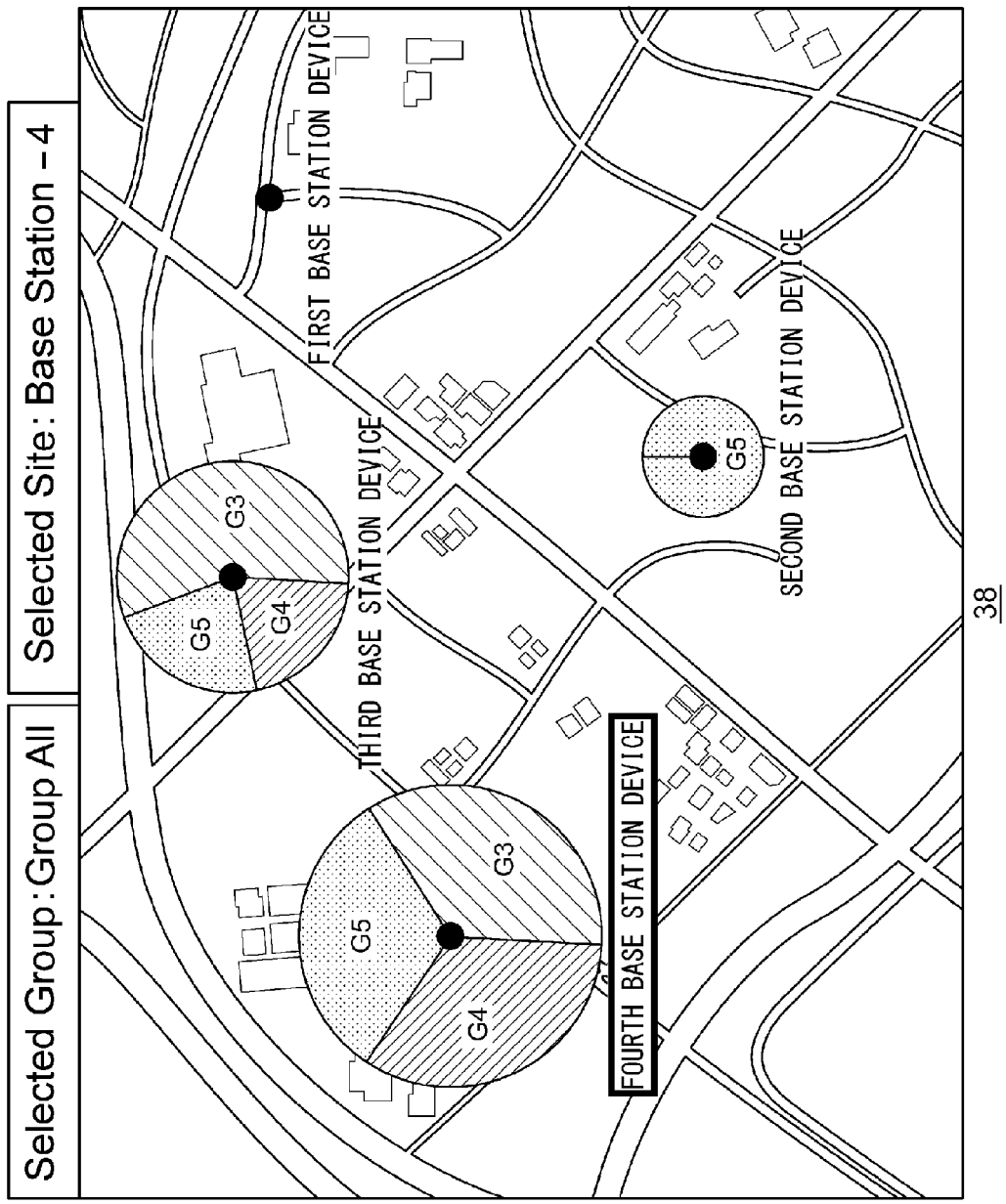
FIG. 13 shows a screen displayed on the display unit according to Embodiment 4.

The display unit 38 displays the map image from the processing unit 32. In other words, the display unit 38 displays, for each base station device 10, information indicating the total number of terminal devices 12 included in the groups registered in the base station device 10 selected in the selection unit 36 and the proportion of the number of terminal devices 12 in each group relative to the total number. FIG. 13 shows a screen displayed on the display unit 38 according to Embodiment 4. The user selects the fourth base station device 10d and the total number of terminal devices 12 included in the groups registered in the fourth base station device 10d selected is indicated by the size of the circle graph. As described above, the total number of terminal devices 12 included in the groups registered in each base station is represented by the length of radius of the circle graph. Of the groups registered in the other nearby base station devices 10, the total number of terminal devices 12 included in the groups registered in the fourth base station device 10d is indicated by the size of the circle graph. In this process, those groups not registered in the fourth base station device 10d are not shown in the circle graph for the other nearby base station devices 10. For example, the circle graph for the first base station device 10a" is not shown in the example shown in FIG. 13 because no groups are commonly registered in the first base station device 10a and the fourth base station device 10d. Further, the sectors representing the respective groups may be colored differently depending on the group.

According to this embodiment, information indicating the total number of terminal devices included in the groups registered in the selected base station device and the proportion of the number of terminal devices in each group relative to the total number is displayed for each base station. It is therefore possible to know, at a glance, the destination base station devices capable of communicating with the selected base station device or the area where calls occur. It is also possible to estimate that the larger the number of other base station devices displayed, the larger the volume of communication between base station devices.

Embodiment 5

A description will now be given of Embodiment 5. Embodiment 5 represents a variation to Embodiment 1. Like Embodiment 1, Embodiment 5 relates to a business wireless system that includes a monitoring device. The monitoring device according to Embodiment 1 displays, for a selected group, information indicating the number of terminal devices registered in each base station. Specifically, the radius of the circle graph is adjusted in accordance with the number of terminal devices. Embodiment 5 is directed to the purpose of allowing the user to know information other than the number of terminal devices, by using a graph. The monitoring device according to Embodiment 5 derives an index indicating the level of congestion in the base station device and creates a graph in accordance with the value of the level of congestion. The business wireless system 100 and the monitoring device 20 according to Embodiment 5 are of the same type as those of FIGS. 1 and 3. The following description concerns a difference.

The processing unit 32 receives the result of selection from the selection unit 36. The processing unit 32 extracts, from the storage unit 34, the number of terminal devices 12 included in the group selected in the selection unit 36, for each base station device 10. The processing unit 32 derives, for each base station device 10, the ratio between the number of terminal devices 12 extracted and the number of usable channels in the base station device 10. In this case, the value obtained by dividing the number of terminal devices 12 included in the selected group by the number of channels of the base station device 10 (hereinafter, referred to as "index 1") is derived as the ratio. Index 1 is translated into the radius of the circle graph. The larger the index, the larger the radius.

For example, it will be assumed that the number of terminal devices 12 included in a given group in the first base station device 10a is identical to the corresponding number in the second base station device 10b. It will also be assumed that the number of usable channels in the first base station device 10a is "10" and the number of usable channels in the second base station device 10b is "20". In this situation, the probability of busy channel would be higher in the first base station device 10a than in the second base station device 10b. Index 1 can be said as an index indicating the level of congestion in the base station device 10. Therefore, the processing unit 32 derives the index indicating the level of congestion in each base station device 10 based on the information received in the receiving unit 30.

As in the foregoing embodiments, the processing unit 32 also maintains a map image on which the locations of the base station devices 10 are mapped and superimposes a circle graph corresponding to a base station device 10 at the location of that base station device 10. The same process is performed for each base station device 10. The processing unit 32 causes the display unit 38 to display the display data on which the circle graph is superimposed (hereinafter, also referred to as "map image").

Figure 14:
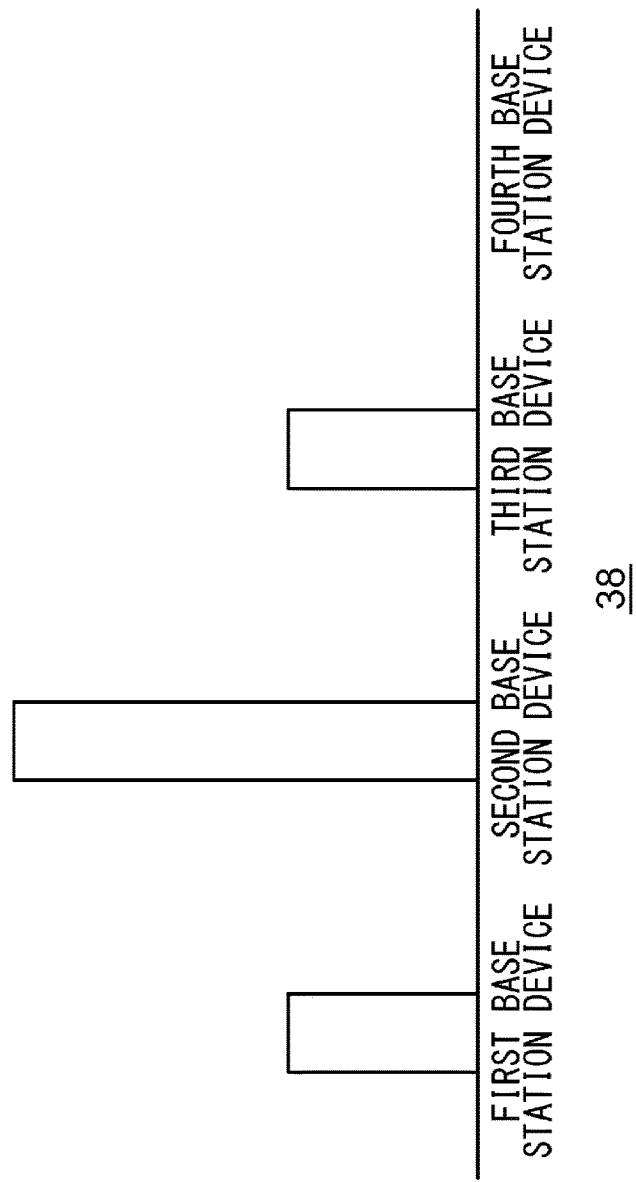
FIG. 14 shows an alternative screen displayed on the display unit according to Embodiment 5.

The display unit 38 displays the map image from the processing unit 32. Specifically, the display unit 38 displays, for each base station device 10, index 1 (an index indicating the level of congestion) for the group selected in selection unit 36 and derived in the processing unit 32. The graph is displayed as in FIG. 7. As in the foregoing embodiments, other forms of graph (e.g., a bar graph) may be used in place of a circle graph to display index 1. The numerical value of index 1 may be directly displayed instead of a graph. FIG. 14 shows an alternative screen displayed on the display unit 38 according to Embodiment 5. As illustrated, index 1 for each base station device 10 is shown in the form of a bar graph. As shown in FIG. 14, the graph may not be superimposed on a map image.

According to this embodiment, an index indicating the level of congestion in each base station device is derived based on information on the number of terminal devices included in the groups registered in the base station device. The derived index is displayed for each base station device for at least one group. Accordingly, it is possible to know a base station device in which the volume of communication is large. Since the ratio between the number of terminal devices included in the selected group and the number of usable channels in the base station device is derived for each base station device and displayed accordingly, it is possible to identify a base station device in which the channel is likely to be busy. By displaying index 1, it is easy to know the probability of busy channel and the need for increasing facilities of the base station.

Embodiment 6

A description will now be given of Embodiment 6. Embodiment 6 represents a combination of Embodiment 5 and Embodiment 2. Like the foregoing embodiments, Embodiment 6 relates to a business wireless system that includes a monitoring device. The monitoring device according to Embodiment 5 displays index 1 indicating the level of congestion in the base station device in the form of a graph for the selected group. The monitoring device according to Embodiment 6 changes the display of Embodiment 5 in time sequence. In this process, the information is displayed in animation. The business wireless system 100 and the monitoring device 20 according to Embodiment 6 are of the same type as those of FIGS. 1 and 3. The following description concerns a difference.

The processing unit 32 receives the result of selection from the selection unit 36. The processing unit 32 extracts, from the storage unit 34, the number of terminal devices 12 included in the group selected in the selection unit 36, for each base station device 10. As described above, the processing unit 32 creates a map image on which a circle graph is superimposed (hereinafter, also referred to as "map image") by deriving index 1. The processing unit 32 causes the display unit 38 to display the circle graph thus created. The processing unit 32 repeatedly executes the above process, changing the point of time of acquisition in FIG. 5. As a result, the processing unit 32 successively derives index 1 in accordance with the information successively received in the receiving unit 30. The display unit 38 updates the display of the map image according to index 1 successively derived in the processing unit 32. The graph is displayed as in FIGS. 8A-8B. As in Embodiment 2, the information on the current date and time may be displayed and updated on the map image on a real time basis. Alternatively, the past information may be displayed in animation for a short period of time. Alternatively, the processing unit 32 may store the point of time of acquisition and index 1, mapping the information to each other and may read index 1 for a designated point of time of acquisition from the database of the storage unit 34 when the map image, etc. is displayed. As explained in Embodiment 2, the processing unit 32 may alternatively use a plurality of items of data that differ in points of time of acquisition (date and time of acquisition) to calculate a statistical value and calculate index 1 based on the statistical value.

According to this embodiment, time-dependent change in index 1 can be easily known.

Embodiment 7

A description will now be given of Embodiment 7. Embodiment 7 represents a variation to Embodiment 3. Like the foregoing embodiments, Embodiment 7 relates to a business wireless system that includes a monitoring device. The monitoring device according to Embodiment 3 displays information indicating the total number of terminal devices 12 included in the entire groups and also displays information indicating the proportion of the number of terminal devices in each group registered in the base station device relative to the total number. Embodiment 7 is directed to the purpose of allowing the user to know information other than the total number of terminal devices. The monitoring device according to Embodiment 7 derives an index indicating the level of congestion in the base station device and creates a graph in accordance with the value of the level of congestion. The business wireless system 100 and the monitoring device 20 according to Embodiment 7 are of the same type as those of FIGS. 1 and 9. The following description concerns a difference.

The processing unit 32 derives the ratio between the total number of terminal devices 12 included in the groups registered in a given base station device 10 and the number of usable channels in the base station device 10. In this case, the value obtained by dividing the total number of terminal devices 12 included in the groups by the number of channels of the base station device 10 (hereinafter, referred to as "index 2") is derived as the ratio for each base station device 10. Index 2 is translated into the radius of the circle graph. The larger the index, the larger the radius. Further, the circle graph is segmented in accordance with the proportion of the number of terminal devices 12 in each group relative to the total number. As in the foregoing embodiments, the processing unit 32 maintains a map image on which the locations of the base station devices 10 are mapped and superimposes the circle graph corresponding to a base station device 10 at the location of that base station device 10. The same process is performed for each base station device 10. The processing unit 32 causes the display unit 38 to display a map image on which the circle graph is superimposed (hereinafter, also referred to as "map image").

The display unit 38 displays the map image from the processing unit 32. Specifically, the display unit 38 displays, for each base station device 10, index 2 derived in the processing unit 32 and displays, for each base station device 10, information indicating the proportion of the number of terminal devices 12 in each group registered in the base station device 10 relative to the total number. The graph is displayed as in FIG. 10. It can be said that the larger the value of index 2 and the number of groups registered in the base station device 10, the higher the probability of busy channel and the need for increasing the facilities of the base station device 10. Index 2 can also be said as an index indicating the level of congestion in the base station device 10. An alternative form of graph (e.g., a bar graph) may be displayed in place of a circle graph. For example, index 2 may be translated into the height of a bar graph, and the bar graph may be segmented according to the number of terminal devices 12 in each group. Further, information indicating the proportion of the number of terminal devices 12 in each group registered in the base station device 10 relative to the total number may not be displayed.

According to this embodiment, the ratio between the total number of terminal devices included in the groups registered in a given base station device and the number of usable channels in the base station device is derived and displayed for each base station device. Accordingly, it is easy to know the probability of busy channel and the need for increasing the facilities of the base station. Since information indicating the proportion of terminal devices in each group registered in the base station device relative to the total number is displayed for each base station device, it is possible to identify a base station device in which a call is likely to occur.

Embodiment 8

A description will now be given of Embodiment 8. Embodiment 8 represents a variation to Embodiment 7. The index of Embodiment 8 differs from index 2. The business wireless system 100 and the monitoring device 20 according to Embodiment 8 are of the same type as those of FIGS. 1 and 9. The following description concerns a difference.

The processing unit 32 derives the ratio between the number of groups registered in a given base station device 10 and the number of usable channels in the base station device 10. In this case, the value obtained by dividing the number of groups registered in each base station device 10 by the number of channels of the base station device 10 (hereinafter, referred to as "index 3") is derived as the ratio. Index 3 is translated into the radius of a circle graph or the height of a bar graph. The graph is not segmented into groups.

It can be said that the larger the value of index 3 in a base station device 10, the higher the probability of busy channel and the need for increasing the facilities of the base station device 10. For example, it will be assumed that the number of channels is "10" and the number of groups registered is "5" in the first base station device 10a, and the number of channels is "20" and the number of groups registered is "2" in the second base station device 10b. In this case, index 3 of the first base station device 10a is "0.5" and index 3 of the second base station device 10b is "0.1". It is known that the probability of busy channel is higher and the need for increasing the facilities is higher in the first base station device 10a than in the second base station device 10b. Index 3 can also be said as an index indicating the level of congestion in the base station device 10.

According to this embodiment, the ratio between the number of groups registered in a base station device and the number of usable channels in the base station device is derived and displayed for each base station. Accordingly, it is easy to know the need for increasing the facilities of the base station. Since index 3 is used instead of the number of terminals included in the groups, the process is made easy.

Embodiment 9

A description will now be given of Embodiment 9. Embodiment 9 represents a variation to Embodiments 7 and 8. The index of Embodiment 8 differs from index 2 and index 3. The business wireless system 100 and the monitoring device 20 according to Embodiment 8 are of the same type as those of FIGS. 1 and 9. The following description concerns a difference.

The processing unit 32 derives an index based on the ratio between the number of terminal devices 12 included in the groups registered in the base station device 10 and the number of usable channels in the base station device 10 and the ratio between the number of groups registered in the base station device 10 and the number of usable channels in the base station device 10. In this case, "index 4" is derived according to expression (1) or expression (2). In expression (1) and expression (2), the number of channels of a given base station device 10 is denoted by "C", the number of groups registered in the base station device 10 is denoted by "G", the number of terminal devices 12 included in group j is denoted by D[j], and index 4 is denoted by Z[4]. Expression (1) is as follows:

$$Z[4] = \alpha 1 \left( \frac{\sum_{j=1}^{N} D[j]}{C} \right)^{\lambda 1} + \alpha 2 \left( \frac{G}{C} \right)^{\lambda 2} \quad \text{Expression (1)}$$

In expression (1), $\alpha 1$ and $\alpha 2$ denote constants that satisfy $\alpha 1 > 0$ and $\alpha 2 > 0$, and $\lambda 1$ and $\lambda 2$ denote constants that satisfy $\lambda 1 > 0$ and $\lambda 2 > 0$. N denotes the total number of groups. Expression (1) translates into weighted averaging of the two terms, using $\alpha 1$ and $\alpha 2$ as weight coefficients. The larger $\alpha 2$ is than $\alpha 1$, the larger the impact of the number of groups G on index 4. The exponentiation computation is not performed by setting $\lambda 1 = \lambda 2 = 1$.

Expression (2) is as follows:

$$Z[4] = \beta \left( \frac{\sum_{j=1}^{N} D[j]}{C} \right)^{\mu 1} \left( \frac{G}{C} \right)^{\mu 2} \quad \text{Expression (2)}$$

In expression (2), $\beta$ denotes a constant that satisfies $\beta > 0$, and $\mu 1$ and $\mu 2$ denote constants that satisfy $\mu 1 > 0$ and $\mu 2 > 0$. The exponentiation computation is not performed by setting $\mu 1 = \mu 2 = 1$. The smaller the number C of channels of the base station device 10, the larger the number of groups G, and the larger the total number of terminal devices 12, the larger the value of index 4 calculated according to expression (1) or expression (2). The larger index 4, the higher the probability of busy channel in the base station device 10 and the need for increasing the facilities of the base station device 10. Index 4 can also be said as an index indicating the level of congestion in the base station device 10.

According to this embodiment, index 4 is displayed for each base station device. Accordingly, it is easy to know the probability of busy channel and the need for increasing the facilities of the base station. Since information indicating the proportion of the number of terminal devices in each group registered in the base station device relative to the total number is displayed, it is possible to identify a base station device in which a call is likely to occur.

Described above is an explanation based on an exemplary embodiment. The embodiment is intended to be illustrative only and it will be obvious to those skilled in the art that various modifications to constituting elements and processes could be developed and that such modifications are also within the scope of the present embodiment.

Embodiment 2 may be combined with Embodiment 3. In this case, the display of Embodiment 3 is updated with the elapse of time. According to this variation, it is possible to know whether the degree of shortage of channel resources in the entire base stations is temporary or continuous.

Embodiment 4 may be combined with embodiment 2. In this case, the display of embodiment 4 is updated with the elapse of time. According to this variation, it is easy to know whether the variation in areas of call makes a transition with time. It is also possible to estimate a time zone in which the volume of communication between base station devices is large and a time zone in which it is small.

Embodiment 6 may be combined with any of Embodiments 7 through 9. In this case, the display of embodiments 7 through 9 is updated with the elapse of time. According to this variation, it is easy to know the time-dependent change in one of indices 2 through 4.

Constants a and b may be used to calculate $a \times Z[i] + b$ and the result may be used as indices 1-4 (index $Z[i](i=1-4)$) according to Embodiments 5 through 9. Alternatively, logarithm may be used to calculate a value $\log(Z[i])$ or a square root may be used to calculate a value $\mathrm{sqrt}(Z[i])$ so that the resultant values may be used as new indices. According to this variation, the values of indices can be accommodated in a range easy to handle.

According to the embodiments 1 to 9, the monitoring device 20 is connected to the network 14. Alternatively, however, the monitoring device 20 may be built in one of the base station devices 10. According to this variation, the flexibility of the configuration is improved.

The embodiments may be characterized by the following items.

(Item 1-1)

A monitoring device for monitoring a communication system in which a plurality of groups each including a plurality of terminal devices are formed, and each of a plurality of base station devices assigns a channel to each group to enable communication from one of the terminal devices included in the group to which the channel is assigned to another terminal device included in the group, the monitoring device comprising:

a receiving unit that receives information on the number of terminal devices included in the groups registered in each base station device; and a processing unit that creates display data for displaying, for each base station device, information indicating the number of terminal devices based on the information received in the receiving unit.

(Item 1-2)

The monitoring device according to item 1-1, further comprising a selection unit that selects one of the plurality of groups, wherein the processing unit creates display data for displaying, for each base station device, information indicating the number of terminal devices included in the group selected in the selection unit.

(Item 1-3)

The monitoring device according to item 1-1, wherein the processing unit creates display data for displaying, for each base station device, information indicating the total number of terminal devices included in the groups registered in a base station device and a proportion of the number of terminal devices in each group registered in the base station device.

(Item 1-4)

The monitoring device according to item 1-1, further comprising a selection unit that selects one base station device, wherein the processing unit creates display data for displaying, for each base station device, information indicating the total number of terminal devices included in the groups registered in the base station device selected in the selection unit and a proportion of the number of terminal devices in each group.

(Item 1-5)

The monitoring device according to one of items 1-1 through 1-4, wherein the receiving unit successively receives the information on the number of terminal devices included in the groups registered in each base station, and the processing unit updates the display data in accordance with the information successively received in the receiving unit.

(Item 1-6)

The monitoring device according to one of items 1-1 through 1-5, wherein the receiving unit successively receives the information on the number of terminal devices included in the groups registered in each base station, and the processing unit calculates a statistical value related to the number of terminal devices, by using a plurality of items of information successively received in the receiving unit, and creates display data for displaying information indicating the statistical value for each base station.

(Item 1-7)

A monitoring method for monitoring a communication system in which a plurality of groups each including a plurality of terminal devices are formed, and each of a plurality of base station devices assigns a channel to each group to enable communication from one of the terminal devices included in the group to which the channel is assigned to another terminal device included in the group, the monitoring method comprising:

receiving information on the number of terminal devices included in the groups registered in each base station device; and creating display data for displaying, for each base station device, information indicating the number of terminal devices based on the received information.

(Item 1-8)

A non-transitory computer-readable memory medium storing a program for monitoring a communication system in which a plurality of groups each including a plurality of terminal devices are formed, and each of a plurality of base station devices assigns a channel to each group to enable communication from one of the terminal devices included in the group to which the channel is assigned to another terminal device included in the group, the program comprising computer-implemented modules including:

a module that receives information on the number of terminal devices included in the groups registered in each base station device; and a module that creates display data for displaying, for each base station device, information indicating the number of terminal devices based on the received information.

(Item 2-1)

A monitoring device for monitoring a communication system in which a plurality of groups each including a plurality of terminal devices are formed, and each of a plurality of base station devices assigns a channel to each group to enable communication from one of the terminal devices included in the group to which the channel is assigned to another terminal device included in the group, the monitoring device comprising:

a receiving unit that receives information on the number of terminal devices included in the groups registered in each base station device; and a processing unit that derives an index indicating a level of congestion in each base station based on the information received in the receiving unit and creates display data for displaying, for each base station device, information indicating the derived index.

(Item 2-2)

The monitoring device according to item 2-1, further comprising: a selection unit that selects one of the plurality of groups, wherein the processing unit derives, for each base station device, a ratio between the number of terminal devices included in the group selected in the selection unit and the number of usable channels in the base station, as the index, and creates display data for displaying, for each base station device, information indicating the derived index.

(Item 2-3)

The monitoring device according to item 2-1, wherein the processing unit refers to the information received in the receiving unit to derive, for each base station device, a ratio between the total number of terminal devices included in the groups registered in a base station device and the number of usable channels in the base station device, as the index.

(Item 2-4)

The monitoring device according to item 2-1, wherein the processing unit refers to the information received in the receiving unit to calculate a ratio between the total number of terminal devices included in the groups registered in a base station device and the number of usable channels in the base station device and a ratio between the number of groups registered in the base station device and the number of usable channels in the base station device, and derives the index for each base station based on the two ratios calculated.

(Item 2-5)

The monitoring device according to item 2-1, wherein the processing unit refers to the information received in the receiving unit to derive, for each base station device, a ratio between the number of groups registered in a base station device and the number of usable channels in the base station device.

(Item 2-6)

The monitoring device according to item 2-3 or 2-4, wherein the processing unit creates display data for displaying, for each base station device, information indicating a proportion of the number of terminal devices in each group registered in the base station device, in addition to the derived index.

(Item 2-7)

The monitoring device according to one of items 2-1 through 2-6, wherein the receiving unit successively receives the information on the number of terminal devices included in the groups registered in each base station, and the processing unit successively derives the index in accordance with the information successively received in the receiving unit and updates the display data by the successively derived index.

(Item 2-8)

The monitoring device according to one of items 2-1 through 2-7, wherein the receiving unit successively receives the information on the number of terminal devices included in the groups registered in each base station, and the processing unit calculates a statistical value related to the number of terminal devices, by using a plurality of items of information successively received in the receiving unit, and derives the index based on the statistical value.

(Item 2-9)

A monitoring method for monitoring a communication system in which a plurality of groups each including a plurality of terminal devices are formed, and each of a plurality of base station devices assigns a channel to each group to enable communication from one of the terminal devices included in the group to which the channel is assigned to another terminal device included in the group, the monitoring method comprising:

receiving information on the number of terminal devices included in the groups registered in each base station device;

deriving an index indicating a level of congestion in each base station based on the received information; and creating display data for displaying, for each base station device, the derived index.

(Item 2-10)

A non-transitory computer-readable memory medium storing a program for monitoring a communication system in which a plurality of groups each including a plurality of terminal devices are formed, and each of a plurality of base station devices assigns a channel to each group to enable communication from one of the terminal devices included in the group to which the channel is assigned to another terminal device included in the group, the program comprising computer-implemented modules including:

a module that receives information on the number of terminal devices included in the groups registered in each base station device;

a module that derives an index indicating a level of congestion in each base station based on the received information; and a module that creates display data for displaying, for each base station device, information indicating the derived index.

What is claimed is:

1. A monitoring device for monitoring a communication system, the monitoring device comprising:

a receiver that receives:

information related to a plurality of base station devices, wherein the information associates a name of a base station device of the plurality of base station devices, and identifies a communication group of a plurality of communication groups registered in the base station device, and a number of a plurality of terminal devices registered in the base station device and belonging to the communication group; and a processor that:

creates display data for displaying a graph showing, for the communication group, the number of the plurality of terminal devices registered in the base station device, and displays the name of the base station device on a map, associating the graph and the name with a position of the base station device, based on the information received in the receiver, uses a circle graph as the graph, defines a radius of the circle graph based on a total number of the plurality of terminal devices included in the plurality of communication groups registered in the base station device, defines an angle of each of a plurality of sectors resulting from segmenting the circle graph into respective communication groups based on a proportion of the number of the plurality of terminal devices in the communication group registered in the base station device, creates the display data for displaying the circle graph on the map in association with the position of the base station device, and causes a display device to display the display data.

2. The monitoring device according to claim 1, further comprising:

a selection unit that selects the base station device from the plurality of base station devices included in the communication system, wherein the processor further:

identifies the communication group registered in the base station device selected in the selection unit, detects, from the plurality of base station devices, the base station device in the communication groups-identified is registered, and creates the display data for displaying, for the base station device detected, the graph showing, for the communication group identified, the number of the plurality of terminal devices registered in the base station device, and displaying the name of the base station device on the map, associating the graph and the name with the position of the base station device.

3. The monitoring device according to claim 1, wherein the information received by the receiver includes the number of the plurality of terminal devices at a plurality of points of time, and wherein the processor further creates, for each of the plurality of points of time, the graph corresponding to the base station device to create a frame that forms animation and causes the display device to display the animation to show variation in the number of the plurality of terminal devices belonging to the communication group with an elapse of time.

4. A non-transitory computer-readable memory medium storing executable instructions that, in response to execution, cause a computer to perform operations for monitoring a communication system, the operations comprising:

receiving information related to a plurality of base station devices, wherein the information associates a name of a base station device of the plurality of base station devices, identifies a communication group of a plurality of communication groups registered in the base station device, and a number of a plurality of terminal devices registered in the base station device and belonging to the communication group;

creating display data for displaying a graph showing, for the communication group, the number of the plurality of terminal devices registered in the base station device, and displaying the name of the base station device on a map, associating the graph and the name with a position of the base station device, based on the information;

using a circle graph as the graph;

defining a radius of the circle graph based on a total number of the plurality of terminal devices included in the plurality of communication groups registered in the base station device;

defining an angle of each of a plurality of sectors resulting from segmenting the circle graph into respective communication groups based on a proportion of the number of the plurality of terminal devices in the communication group registered in the base station device;

creating the display data for displaying the circle graph on the map in association with the position of the base station device; and displaying the display data.

5. A monitoring device for monitoring a communication system, the monitoring device comprising:

a receiver that receives:

information related to a plurality of base station devices, wherein the information associates a name of a base station device of the plurality of base station devices, and identifies a communication group of a plurality of communication groups registered in the base station device, and a number of a plurality of terminal devices registered in the base station device and belonging to the communication; and a processor that:

derives an index indicating a level of congestion in the base station device based on the information received in the receiver such that a larger the number of the plurality of terminal devices in the base station device, a larger a value of the level, creates display data for displaying a graph showing, for the base station device, the index and a proportion of the number of the plurality of terminal devices in the communication group, displays the name of the base station device on a map, associating the graph and the name with a position of the base station device, uses a circle graph as the graph, defines a radius of the circle graph based on a total number of the plurality of terminal devices included in the plurality of communication groups registered in the base station device, defines an angle of each of a plurality of sectors resulting from segmenting the circle graph into respective communication groups based on a proportion of the number of the plurality of terminal devices in the communication group registered in the base station device, creates the display data for displaying the circle graph on the map in association with the position of the base station device, and causes a display device to display the display data.

6. The monitoring device according to claim 5, wherein the processor further derives, as the index, a value obtained by dividing the total number of the plurality of terminal devices registered in the base station device by a number of channels defined in the base station device.

7. The monitoring device according to claim 5, wherein the information received by the receiver includes the number of the plurality of terminal devices at a plurality of points of time, wherein the processor further derives, as the index, a value obtained by dividing the number of the plurality of terminal devices registered in the base station device by a number of channels defined in the base station device, for each of the plurality of points of time, and wherein the processor further creates, for the each of the plurality of points of time, the graph corresponding to the base station device to create a frame that forms animation and causes the display device to display the animation to show variation in the index with an elapse of time.

8. A non-transitory computer-readable memory medium storing executable instructions that, in response to execution, cause a computer to perform operations for monitoring a communication system, the operations comprising:

receiving information related to a plurality of base station devices, wherein the information associates a name of a base station device of the plurality of base station devices, identifies a communication group of a plurality of communication groups registered in the base station device, and a number of a plurality of terminal devices registered in the base station device and belonging to the communication group;

deriving an index indicating a level of congestion in the base station device based on the information such that a larger the number of the plurality of terminal devices in the base station device, larger a value of the level;

creating display data for displaying a graph showing, for the base station device, the index and a proportion of the number of the plurality of terminal devices in the communication group, and displaying the name of the base station device on a map, associating the graph and the name with a position of the base station device;

using a circle graph as the graph;

defining a radius of the circle graph based on a total number of the plurality of terminal devices included in the plurality of communication groups registered in the base station device;

defining an angle of each of a plurality of sectors resulting from segmenting the circle graph into respective communication groups based on a proportion of the number of the plurality of terminal devices in the communication group registered in the base station device;

creating the display data for displaying the circle graph on the map in association with the position of the base station device; and displaying the display data.

9. A monitoring device for monitoring a communication system, the monitoring device comprising:

a receiver that receives:

information related to a plurality of base station devices, the information associates a name of a base station device of the plurality of base station devices, and identifies a communication group registered in the base station device; and a processor that:

creates display data for displaying a graph showing a number of a plurality of communication groups registered in the base station device and a name of the base station device on a map, associates the graph and the name with a position of the base station device, based on the information received in the receiver, uses a circle graph as the graph, defines a radius of the circle graph based on a total number of the plurality of terminal devices included in the plurality of communication groups registered in the base station device, defines an angle of each of a plurality of sectors resulting from segmenting the circle graph into respective communication groups based on a proportion of the number of the plurality of terminal devices in the communication group registered in the base station device, creates the display data for displaying the circle graph on the map in association with the position of the base station device, and causes a display device to display the display data.

10. The monitoring device according to claim 9, further comprising:

a selection unit that selects the base station device from the plurality of base station devices included in the communication system, wherein the processor further:

identifies the communication group registered in the base station device selected in the selection unit, detects, from the plurality of base station devices, the base station device in the communication group identified is registered, and creates the display data for displaying information indicating the number of the communication groups identified and registered in the base station device that is detected, and displaying the name of the base station device on a map, associating the information and the name with the position of the base station device.

11. A non-transitory computer-readable memory medium storing executable instructions that, in response to execution, cause a computer to perform operations for monitoring a communication system, the operations comprising:

receiving information related to a plurality of base station devices, wherein the information associates a name of a base station device of the plurality of base station devices, and identifies a communication group registered in the base station device;

creating display data for displaying information showing a number of a plurality of communication groups registered in the base station device and the name of the base station device on a map, associating the information and the number of the plurality of communication groups with a position of the base station device, based on the information received in the receiver;

using a circle graph;

defining a radius of the circle graph based on a total number of a plurality of terminal devices included in the plurality of communication groups registered in the base station device;

defining an angle of each of a plurality of sectors resulting from segmenting the circle graph into respective communication groups based on a proportion of the number of the plurality of terminal devices in the communication group registered in the base station device;

creating the display data for displaying the circle graph on the map in association with the position of the base station device; and displaying the display data.

12. A monitoring device for monitoring a communication system, the monitoring device comprising:

a receiver that receives information related to a plurality of base station devices, the information associates a name of a base station device and identifies a communication group registered in the base station device; and a processor that:

derives an index indicating a level of congestion in the base station device based on the information received in the receiver such that a larger a number of a plurality of communication groups registered in the base station device, a larger a value of the level, creates display data for displaying, for the base station device, a graph showing the index and a proportion of a number of a plurality of terminal devices in the communication group, displays the name of the base station device on a map, associating the graph and the name with a position of the base station device, uses a circle graph as the graph, defines a radius of the circle graph based on a total number of the plurality of terminal devices included in the plurality of communication groups registered in the base station device, defines an angle of each of a plurality of sectors resulting from segmenting the circle graph into respective communication groups based on a proportion of the number of the plurality of terminal devices in the communication group registered in the base station device, creates the display data for displaying the circle graph on the map in association with the position of the base station device, and causes a display device to display the display data.

13. The monitoring device according to claim 12, wherein the processor further derives, as the index, a value obtained by dividing the number of the plurality of communication groups registered in the base station device by a number of channels defined in the base station device.

14. A non-transitory computer-readable memory medium storing executable instructions that, in response to execution, cause a computer to perform operations for monitoring a communication system, the operations comprising:

receiving information related to a plurality of base station devices, wherein the information associates a name of a base station device, and identifies a communication group registered in the base station device;

deriving an index indicating a level of congestion in the base station device based on the information such that a larger a number of a plurality of communication groups registered in the base station device, a larger a value of the level of congestion in the base station device;

creating display data for displaying a graph showing, for the base station device, the index and a proportion of a number of a plurality of terminal devices in the communication group, and displaying the name of the base station device on a map, associating the graph and the name with a position of the base station device;

using a circle graph as the graph;

defining a radius of the circle graph based on a total number of the plurality of terminal devices included in the plurality of communication groups registered in the base station device;

defining an angle of each of a plurality of sectors resulting from segmenting the circle graph into respective communication groups based on a proportion of the number of the plurality of terminal devices in the communication group registered in the base station device;

creating the display data for displaying the circle graph on the map in association with the position of the base station device;

causing a display device to display the display data; and displaying the display data.

* * * * *